United States Patent
Lim et al.

(10) Patent No.: US 8,984,412 B2
(45) Date of Patent: Mar. 17, 2015

(54) ADVERTISING-DRIVEN THEME PREVIEW AND SELECTION

(75) Inventors: Jesse Kui Hsiang Lim, Bellevue, WA (US); Jose Emmanuel Miranda Steiner, Redmond, WA (US); Joost Martijn Bon, Seattle, WA (US); Chad Steven Estes, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1022 days.

(21) Appl. No.: 12/241,952

(22) Filed: Sep. 30, 2008

(65) Prior Publication Data

US 2010/0083170 A1    Apr. 1, 2010

(51) Int. Cl.
*G06F 3/00*     (2006.01)
*G06Q 30/00*    (2012.01)
*G06Q 30/02*    (2012.01)

(52) U.S. Cl.
CPC ..................... *G06Q 30/02* (2013.01)
USPC ............ 715/744; 715/747; 705/14.4

(58) Field of Classification Search
CPC ............. G06Q 30/0241; G06F 3/0481; G06F 3/04812; G06F 9/4443
USPC ................................ 715/744, 747
See application file for complete search history.

(56) References Cited

U.S. PATENT DOCUMENTS

| | | | |
|---|---|---|---|
| 5,905,492 A * | 5/1999 | Straub et al. ................. | 715/744 |
| 6,784,900 B1 * | 8/2004 | Dobronsky et al. ........... | 715/744 |
| 7,231,602 B1 * | 6/2007 | Truelove et al. .............. | 715/205 |
| 7,610,352 B2 * | 10/2009 | AlHusseini et al. .......... | 709/217 |
| 2002/0167542 A1 * | 11/2002 | Florin ........................... | 345/745 |
| 2003/0210280 A1 | 11/2003 | Baker et al. | |
| 2004/0012628 A1 * | 1/2004 | Kropf et al. .................. | 345/744 |
| 2004/0205514 A1 | 10/2004 | Sommerer et al. | |
| 2005/0165652 A1 | 7/2005 | Ravenstein | |
| 2005/0216547 A1 | 9/2005 | Foltz-Smith et al. | |
| 2005/0223080 A1 | 10/2005 | Gray | |
| 2006/0063575 A1 | 3/2006 | Gatto et al. | |
| 2006/0069618 A1 | 3/2006 | Milener et al. | |

(Continued)

FOREIGN PATENT DOCUMENTS

KR    10-2000-0037462    7/2000
WO    WO 99/13423 A1    3/1999

OTHER PUBLICATIONS

Beard Chris, Introducing Personas, Dec. 14, 2007, https://mozillalabs.com/blog/2007/12/personas-for-firefox/.*

(Continued)

*Primary Examiner* — Nicholas Ulrich
(74) *Attorney, Agent, or Firm* — Bryan Webster; Kate Drakos; Micky Minhas

(57) ABSTRACT

An advertisement is associated with an advertiser-sponsored theme. An application generates a page that includes the advertisement. If a first user input event is detected with respect to the advertisement, the advertiser-sponsored theme is temporarily applied to the page, thereby providing a preview of the advertiser-sponsored theme. If a second user input event is detected with respect to the advertisement, the preview of the advertiser-sponsored theme is removed from the page. If a third user input event is detected with respect to the advertisement, the advertiser-sponsored theme is selected for use with the application. A notification may also be provided to other users indicated that the advertiser-sponsored theme was selected for use.

16 Claims, 6 Drawing Sheets

(56) References Cited

U.S. PATENT DOCUMENTS

| | | | |
|---|---|---|---|
| 2007/0033254 A1* | 2/2007 | AlHusseini et al. | 709/205 |
| 2007/0174230 A1 | 7/2007 | Martin | |
| 2008/0040228 A1 | 2/2008 | Gutierrez | |
| 2008/0059296 A1 | 3/2008 | Schau | |
| 2008/0092057 A1* | 4/2008 | Monson et al. | 715/744 |
| 2008/0133336 A1 | 6/2008 | Altman et al. | |
| 2008/0154718 A1 | 6/2008 | Flake et al. | |
| 2008/0155425 A1* | 6/2008 | Murthy et al. | 715/738 |
| 2008/0163202 A1 | 7/2008 | Kembel et al. | |
| 2008/0182628 A1* | 7/2008 | Lee et al. | 455/566 |
| 2008/0227500 A1* | 9/2008 | Heyworth et al. | 455/566 |
| 2008/0276189 A1* | 11/2008 | Dawson | 715/765 |
| 2008/0300908 A1* | 12/2008 | Hunter et al. | 705/1 |
| 2009/0164922 A1* | 6/2009 | Phakousonh et al. | 715/762 |

OTHER PUBLICATIONS

DailyApps, Mozilla Makes Skinning Firefox Easy With Personas, Dec. 19, 2007, http://dailyapps.net/2007/12/mozilla-makes-skinning-firefox-easy-with-personas/.*

Mykmelez, Personas:Personas 0.9.3 development build, Feb. 1, 2008, https://mozillalabs.com/forum/comments.php?DiscussionID=507.*

International Search Report dated May 4, 2010 in International Application No. PCT/US2009/057962.

"Create and edit themes", http://help.adobe.com/en_US/Connect/6.0/Presenter/help.html?content=WS3a32668ae8e7984c61736e10b1fbedbaf-7f83.html, Jul. 10, 2008.

A Caruba, "The Entrepreneur's Guidebook Series", Guidebook 55, Patsula Media, 2001, 23 pages.

"The Lasting Power of Advertising Themes", Ingenuity Research PTY Ltd., Australia, vol. 1, Issue 2, Spring 2001, 4 pages.

"Create and edit themes", retrieved Jul. 10, 2008 from http://help.adobe.com/en_US/Connect/6.0/Presenter/help.html?content=WS3a32668ae8e7984c61736e10b1fbedbaf-783.html, 3 pages.

Chinese Official Action dated May 4, 2012 in Chinese Application No. 200980139396.5.

Chinese Official Action dated Jan. 14, 2013 in Chinese Application No. 20098013996.5.

European Search Report dated Nov. 7, 2013 in European Application No. 09818258.7.

* cited by examiner

ADVERTISING-DRIVEN THEME PREVIEW AND SELECTION

BACKGROUND

Certain types of desktop application programs and World Wide Web ("Web") sites allow users to personalize their user experience. For instance, a Web site may be configured to allow users to select and apply themes, also called "skins," to the pages provided by the Web site. A theme is a collection of attributes and graphical elements that can be utilized to customize the look of an application or a Web page.

A theme may specify the colors, text size, font, static or moving graphics or video, page layout, and other stylistic elements that can be utilized to customize the visual appearance of a desktop or Web application. When used in conjunction with a desktop application program, themes may also allow the customization of other visual elements, such as the size and shape of a user interface window generated by the application program. In some implementations a theme may also allow the customization of audible elements, such as user interface feedback sounds.

In an effort to reach a greater number of potential customers, some advertisers have created custom branded themes for use with Web sites and other types of application programs. These advertiser-sponsored themes are often created under the direction of the advertiser and generally incorporate elements of the advertiser's brand into the theme. For instance, a theme may specify colors and other graphical or audible elements that are consistent with an advertiser's brand. These types of advertiser-sponsored themes are often popular with users that are loyal consumers of the brand. As an example, a user that is a fan of a certain movie may choose to "skin" a Web site or desktop application using a theme that incorporates branding elements from the movie, such as a color scheme and a logo.

One limiting factor in the ability of advertisers to reach large groups of users with advertiser-sponsored themes is the current difficulty that users encounter when trying to locate and select themes. Current implementations require users to navigate through at least several menus to locate available themes. Once the themes have been located, users may then be required to make several selections in order to preview how the Web site or desktop application will appear once the theme has been applied. This can be a frustrating and time consuming process that can lead to a limited exposure of an advertiser-sponsored theme to a large group of users. It can also be difficult for users to share these themes with other users utilizing current implementations.

It is with respect to these considerations and others that the disclosure made herein is presented.

SUMMARY

Concepts and technologies are described herein for advertising-driven theme preview and selection. Through the implementations presented herein, a user can easily view a preview of how a Web site or application program will appear when an advertiser-sponsored theme has been applied thereto. The user can also select the advertiser-sponsored theme for use with the Web site or application program in an efficient manner. The advertising-sponsored theme can also be shared with other users, such as individuals within a social network, who can then preview or apply the theme themselves.

According to embodiments presented herein, an advertisement is associated with an advertiser-sponsored theme. As discussed above, an advertiser-sponsored theme is a theme that is created by or under the direction of an advertiser and that may include elements of the advertiser's brand, such as colors, logos, or other visual elements. The advertisement may include text, graphics, or video, or any combination thereof. In one embodiment, the advertiser-sponsored theme includes visual elements that are also contained in the advertisement. For instance, colors, logos, or other visual elements contained in the advertisement may also be a part of the advertiser-sponsored theme.

In order to present the advertisement to a user, a Web or desktop application generates an application page that includes the advertisement. For instance, in the context of a Web application, a Web page may be generated and displayed by a Web browser executing on a client computer that includes the advertisement. In one implementation, program code is embedded in the application page that can detect user input events with respect to the advertisement. If a first user input event is detected, such as a mouse cursor hovering over the advertisement, the advertiser-sponsored theme will be temporarily applied to the application page, thereby providing a preview of the advertiser-sponsored theme. If a second user input event is detected, such as the mouse cursor moving off of the advertisement, the preview of the advertiser-sponsored theme will be removed. In this manner, a user can view a preview of an advertiser-sponsored theme as applied to an application page through a simple interaction with an advertisement.

According to embodiments, a third user input event may be detected that indicates that a user would like to apply the advertiser-sponsored theme to the application page, and potentially other pages or displays provided by the Web or desktop application, in a persistent manner. For instance, in one embodiment, a user may place a mouse cursor on the advertisement and select a mouse button in order to cause the advertiser-sponsored theme to be selected for use with the application. In order to select the advertiser-sponsored theme for use with the Web or desktop application, data may be stored in a user profile corresponding to the user that identifies the advertiser-sponsored theme. Additionally, data may be stored for use by the advertiser indicating that the advertiser-sponsored theme was selected for use.

According to other embodiments, a notification is provided to other users indicating that the advertiser-sponsored theme was selected for use. For instance, in one implementation users within a social network of the user that selected the advertiser-sponsored theme are notified that the theme was selected. These users may also be permitted to preview the application of the advertiser-sponsored theme and to apply the theme using the mechanism described above.

It should be appreciated that while various user interfaces and various types of user input events are presented herein in embodiments, other types of user interfaces and user input mechanisms may be utilized with the concepts and technologies presented herein. It should also be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
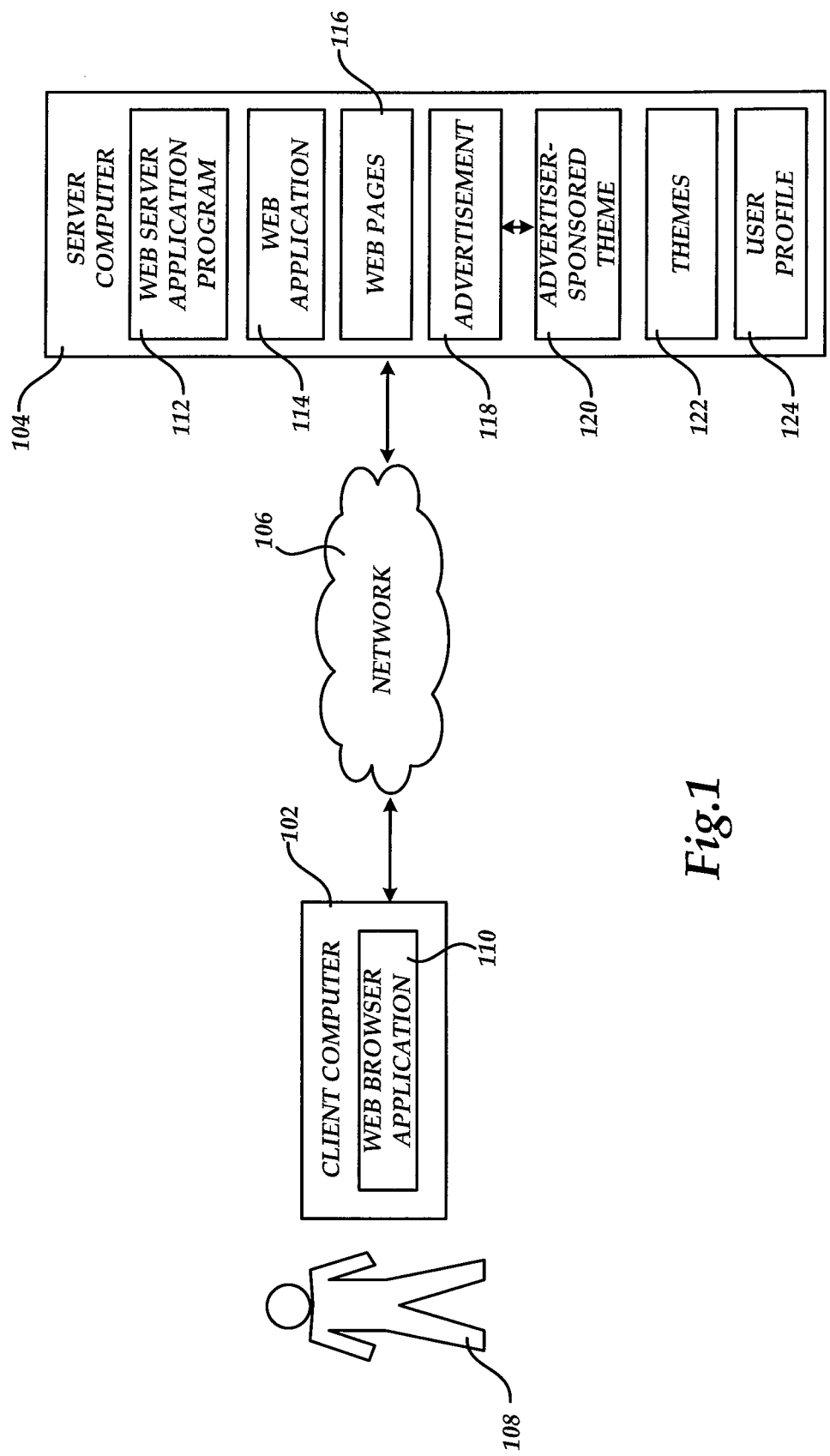
FIG. 1 is a network diagram showing aspects of an illustrative operating environment and several software components provided by the embodiments presented herein.

The following detailed description is directed to concepts and technologies for advertising-driven theme preview and selection. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for advertising-driven theme preview and selection will be described.

Turning now to FIG. 1, details will be provided regarding an illustrative operating environment and several software components provided by the embodiments presented herein. In particular, FIG. 1 shows aspects of a system for advertising-driven theme preview and selection. As shown in FIG. 1, one system provided herein includes a client computer 102 that is connected to a server computer 104 through a network 106. In one embodiment, the client computer 102 is a standard desktop, laptop, or mobile computing system capable of executing a Web browser application 110.

As known in those skilled in the art, the Web browser application 110 is an application program configured to transmit requests for Web pages and other associated content to other computers accessible via a local or wide area network. The Web browser application 110 is also configured to receive a response to these requests and to render the received Web pages and related files for viewing by a user. It should be appreciated that while the client computer 102 is described in embodiments presented herein as a standard desktop computer, many other types of computing systems, such as mobile telephones, smart phones, set top boxes, and other types of computing systems may be utilized to embody the technologies presented herein.

In one embodiment presented herein, the server computer 104 illustrated in FIG. 1 comprises a standard server computer configured to execute a Web server application program 112. As also known in the art, the Web server application program 112 is a software program configured to receive and respond to requests from the Web browser application 112 for Web pages and other types of data files. In particular, in one implementation the Web server application program 114 is configured to receive and respond to requests from the Web browser application 112 for the Web application 114. Additional details regarding the operation of the Web application 114 will be provided below with respect to FIGS. 2-5

It should be appreciated that while a single client computer 102 and a single server computer 104 have been illustrated in FIG. 1, any number of these computing systems may be utilized. Moreover, it should be appreciated that although a single network 106 has been illustrated in FIG. 1, many more network connections may be utilized to enable data communication between the client computer 102 and the server computer 104. In this regard, it should be appreciated that the simplified network architecture illustrated in FIG. 1 is merely illustrative and that more or fewer software and hardware components than illustrated in FIG. 1 may be utilized to implement the embodiments presented herein.

According to embodiments, the user 108 may utilize the client computer 102 to execute the Web browser application 110 and to establish a connection with the Web application 114. In one illustrative embodiment presented herein, the Web application 114 is configured to provide a Web-based electronic mail ("e-mail") service. Through a Web-based user interface provided by the Web application 114, the user 108 can send and receive electronic mail messages. It should be appreciated, however, that while one embodiment presented herein is described in the context of a Web-based e-mail service, the embodiments presented herein can be utilized with any type of Web application. It should also be appreciated that the Web application 114 illustrated in FIG. 1 and described herein may include many more functions than those described herein. Moreover, although the embodiments are presented herein with regard to an application 114 that is accessible through the Web, the concepts and technologies presented herein may be utilized with an application program or operating system executing directly on the client computer 102.

In order to provide the Web application 114, the server computer 104 also stores the Web pages 116. As known in the art, the Web pages 116 include markup language and potentially program code that can be rendered by the Web browser application 112 to provide the visual displays of the Web application 114. In this regard, the server computer 104 may also store graphic files, multimedia files, audio files, executable files, and other types of files that are utilized by the Web browser application 110 in conjunction with the Web pages 116 to render the displays of the Web application 114. For instance, in order to provide an advertisement to the user 108, one of the Web pages 116, also referred to herein as application pages, may reference a graphical file that includes an advertisement 118. The advertisement 118 may comprise a graphical image, a multimedia image, or an executable file that can be rendered by the Web browser application 112 to display an advertisement to the user 108.

According to one implementation provided herein, the Web application 114 is also configured to allow the user 108 to select a theme for use with the Web pages 116 provided by the Web application 114. As discussed briefly above, a theme is a collection of attributes and graphical elements that can be utilized to customize the look of the Web pages 116. For instance, a theme may specify colors, text size, font, static or moving graphics or video, page layout, and other stylistic elements that can be utilized by the Web application 114 when generating the Web pages 116 to customize the look and feel of the Web pages 116. As will be discussed below, when the user 108 selects a theme for use with the Web application 114, data may be stored in a user profile 124 identifying the selection. In this manner, the appropriate theme may be utilized by the Web application 114 to generate the Web pages 116 each time the user 108 utilizes the Web application 114.

According to implementations, the server computer 104 is also configured to store an advertiser-sponsored theme 120. As discussed briefly above, an advertiser-sponsored theme is a theme that is created by or under the direction of an advertiser and that may include elements of the advertiser's brand, such as colors, logos, or other visual elements. In this regard, the Web application 114 may provide various interfaces through the Web pages 116 that allow the user 108 to select the advertiser-sponsored theme 120 for use with the Web pages 116 generated by the Web application 114.

In order to facilitate discovery and the easy preview and selection of the advertiser-sponsored theme 120, the advertiser-sponsored theme 120 is associated with the advertisement 118 in one embodiment. In this embodiment, one of the Web pages 116 is generated by the Web application 114 that contains the advertisement 118. The Web page 116 generated by the Web application 114 also includes program code that can be utilized by the Web browser application 110 to detect user input events with respect to the advertisement 118. As utilized herein, the term "user input event" refers to any event caused by a user 108 through the use of a user input device connected to the client computer 102. For instance, in one embodiment, the Web page 116 that includes the advertisement 118 includes script code that can be executed by the Web browser application 110 to detect when the user 108 has hovered a mouse cursor over the display of the advertisement 118. As known to those skilled in the art, the term "hovering" as utilized herein refers to the act of placing a mouse cursor over a page element without selecting the element through the use of a mouse click or other input event.

In one implementation, the script rendered into the Web page 116 and executed by the Web browser application 110 is configured to detect a mouse cursor hovering over the advertisement 118. In response to detecting such a user input event, the script is further configured to cause the advertiser-sponsored theme 120 to be temporarily applied to the display of the Web page 116 by the Web browser application 110. For instance, in one embodiment, a cascading style sheet ("CSS:) associated with the Web page 116 is modified to generate the preview of the theme 120. In this manner, the user 108 can preview the application of the advertiser-sponsored theme 120 to the display of the Web page 116 by simply hovering the mouse cursor over the display of the advertisement 118. If another user input event is detected, such as the mouse cursor moving off of the display of the advertisement 118, the script contained in the Web page 116 is configured to remove the display of the advertiser-sponsored theme 120 such as by again modifying the CSS. In this manner, the user 108 can view a preview of the advertiser-sponsored theme 120 as applied to the Web page 116 through a simple interaction with the advertisement 118.

It should be appreciated that in the embodiments described herein, JAVASCRIPT is utilized as the scripting language for the script within the Web page 116 for generating the preview of the advertiser-sponsored theme 120. It should be appreciated, however, that any appropriate client-side scripting language or executable code may be utilized in this regard. It should also be appreciated that while the embodiments presented herein are disclosed in the context of mouse hover events with respect to the advertisement 118, virtually any type of user input event can be utilized to cause the Web browser application 110 to generate the preview of the advertiser-sponsored theme 120. For instance, appropriate keyboard commands issued by a user 108 may be utilized in a similar manner.

According to other embodiments, another user input event may be detected that indicates that the user 108 would like to apply the advertiser-sponsored theme to the Web pages 116 of the Web application 114 in a persistent manner. For instance, in one embodiment, the user 108 may place the mouse cursor over the display of the advertisement 118 and select a mouse button in order to cause the advertiser-sponsored theme 120 to be selected for continued use with the Web application 114. In order to select the advertiser-sponsored theme 120 for use with the Web application 114, data may be stored in the user profile 124 corresponding to the user 108 and the selected advertiser-sponsored theme 120. Additionally, the selection of the advertiser-sponsored theme 120 may be tracked for use by an advertiser by storing data indicating that the user 108 has selected the advertiser-sponsored theme 120 for use with the Web application 114. It should be appreciated that, as discussed above, other types of user input events may be performed by the user 108 to indicate to the Web browser application 110 that the user 108 would like to select the advertiser-sponsored theme 120 for continued use with the Web application 114.

According to other embodiments, the Web application 114 may be configured to provide a notification to other users indicating that the user 108 selected the advertiser-sponsored theme 120 for use with the Web application 114. For instance, in one implementation, users within a social network of the user 108 are notified that the advertiser-sponsored theme 120 was selected. As will be described in greater detail below with respect to FIG. 4, these users may also be permitted to preview the application of the advertiser-sponsored theme 120 and to apply the theme 120 in a similar manner as that described above.

It should be appreciated that while the embodiments presented herein are described in the context of the preview, selection, and use of the advertiser-sponsored theme 120, the embodiments herein may be utilized with other types of themes 122, such as non-advertiser sponsored themes. For instance, any type of theme 122 may be associated with an advertisement 118 or another type of graphical image and presented to a user 108 in the manner described above. Additional details regarding the user interfaces and program code provided herein for allowing a user to quickly preview and apply an advertiser-sponsored theme 120 in connection with an advertisement 118 are provided below with respect to FIGS. 2-5.

As discussed briefly above, the Web application 114 allows the user 108 to maintain a user profile 124. The user profile 124 includes information about the user 108. For instance, according to embodiments, the Web application 114 provides a user interface through which the user 108 can provide personal information that is shown to other users on a profile page provided by the Web application 114. This information may include the user's contact information, their date and place of birth, a list of interests, the names of the schools the user has attended, and virtually any other type of information regarding the user 108. Data may also be stored in the user profile 124 identifying the theme 120 that should be utilized to customize the view of the Web application 114 for the user 108. For instance, as will be described in greater detail below, when the user 108 specifies that the advertiser-sponsored theme 120 should be utilized with the Web application 114, data may be stored in the user profile 124 that identifies the advertiser-sponsored theme 120. Additional details regarding this process will be provided below with respect to FIGS. 4-5.

Figure 2:
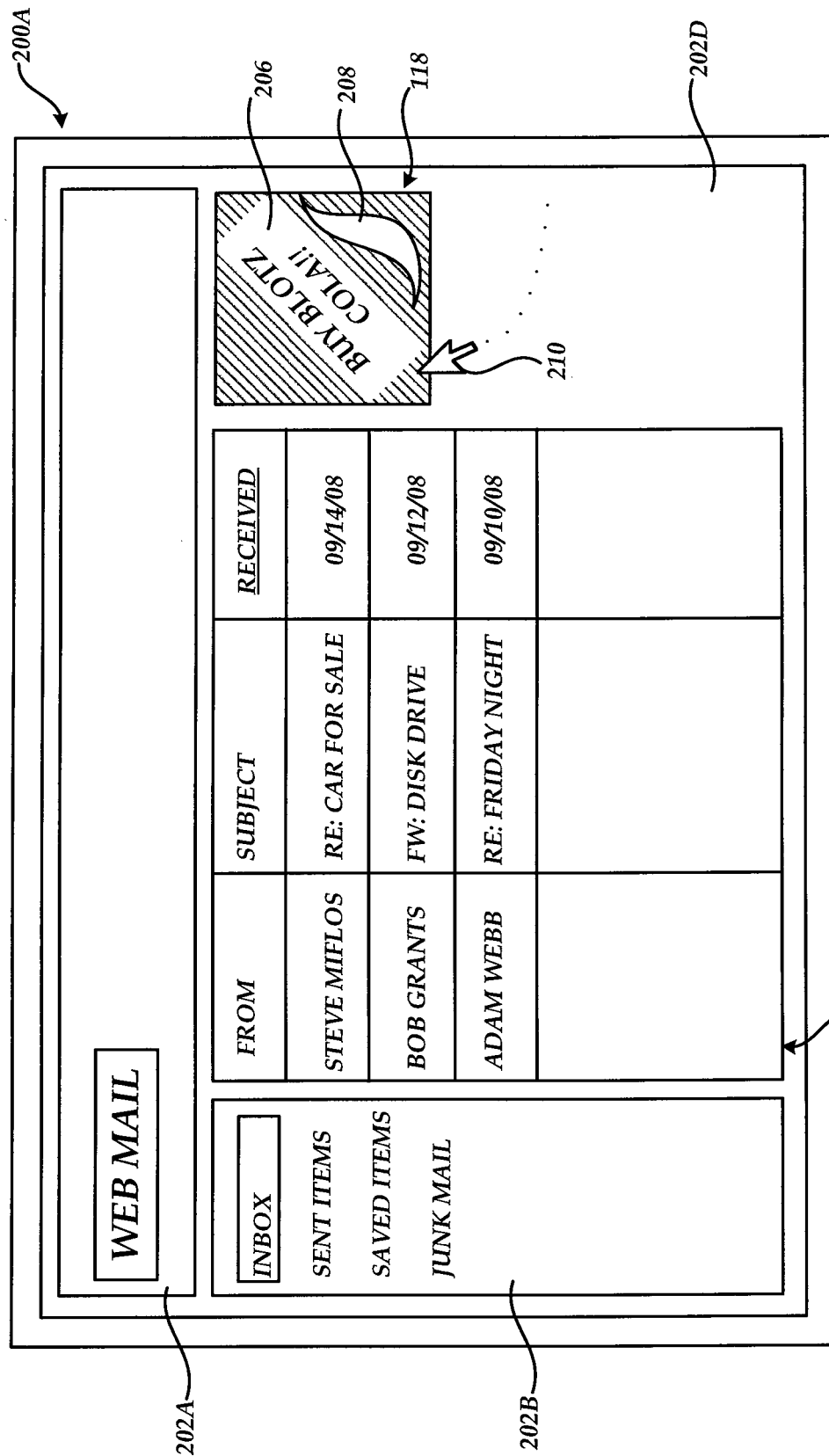
FIGS. 2-3 are user interface diagrams showing aspects of several illustrative user interfaces provided herein for previewing the application of a theme to a Web application and for selecting a theme for use with the Web application in various embodiments presented herein, respectively.

Referring now to FIG. 2, an illustrative user interface 200A will be described that shows one user interface provided by the Web application 114 through which a user 108 may select an advertiser-sponsored theme 120 through an interaction with an advertisement 118. As discussed above, in the embodiments presented herein, the Web application 114 comprises an application for providing Web-based electronic mail. It should be appreciated however that the Web application 114 may comprise any type of application accessible via the World Wide Web that provides the functionality presented herein for previewing, selecting and applying a theme to the provided Web pages 116.

In one implementation, the user interface 200A includes a first user interface pane 202A that identifies the Web application 114. Another user interface pane 202B may be provided through which a user 108 can select various folders containing electronic mail items. A user interface pane 202C may be provided that identifies the subject, sender, and date of receipt of various electronic mail messages. If one of the mail messages is selected, details regarding the mail message may be displayed within the user interface 200A.

In one embodiment, the user interface 200A also includes a user interface pane 202D that includes the advertisement 118. In the example shown in FIG. 2, the advertisement 118 is an advertisement for a brand of cola. The advertisement 118 includes text 206 and a logo 208. It should be appreciated, however, that the advertisement 118 may include other elements of an advertiser's brand, such as colors, graphical or audible elements, and other types of design elements that are consistent with an advertiser's branding or marketing campaign.

A mouse cursor 210 is also shown in FIG. 2. As known in the art, the mouse cursor 210 is displayed by an operating system executing on the client computer 102 in response to the use of a mouse user input device by the user 108. As known in the art, the mouse cursor 210 may be moved around the user interface 200A and a button on the mouse user input device may be utilized to select various items within the user interface 200A. As described briefly above, the mouse cursor 210 may be hovered over the advertisement 118 in one embodiment to cause the advertiser-sponsored theme 120 to be applied to the user interface 200A. This is illustrated in FIG. 3 described below.

Figure 3:
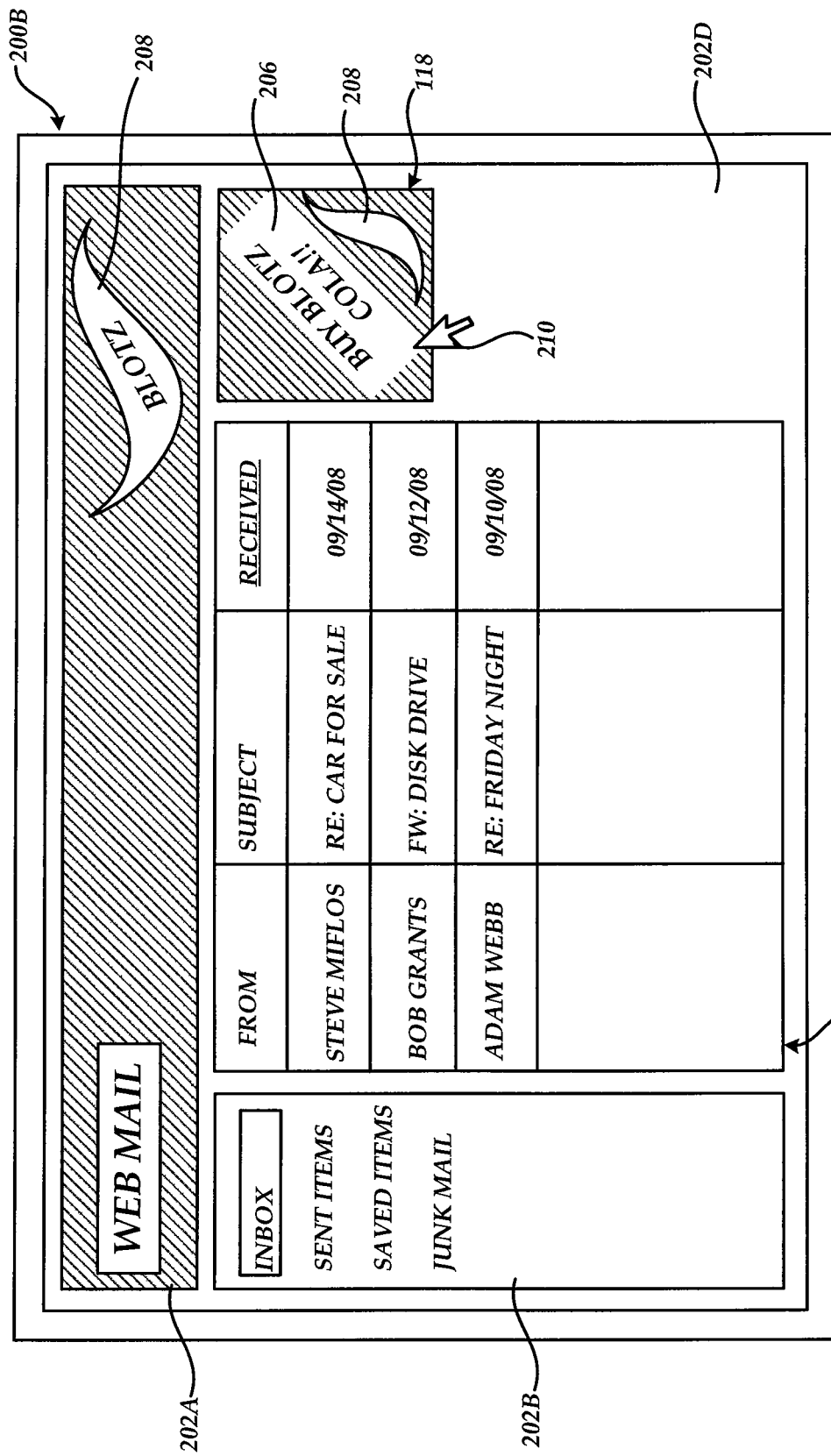

FIG. 3 shows an illustrative user interface 200B that is provided by the Web browser application 112 following the receipt of a user input event hovering the mouse cursor 210 over the advertisement 118. In response to the hovering of the mouse cursor 210 over the advertisement 118, the advertiser-sponsored theme 120 is applied to the user interface 200A, thereby resulting in the user interface 200B shown in FIG. 3. In this example, graphical elements contained in the advertisement 118 have been applied to other portions of the Web page 116 shown in FIG. 3. For instance, in this example, a color scheme, represented by the diagonal lines in FIG. 3, has been applied the user interface pane 202A. Additionally, the logo 208 has also been displayed in the user interface pane 202A along with text identifying the cola brand referenced by the advertisement 118. It should be appreciated that the application of the advertiser-sponsored theme 120 shown in FIG. 3 is merely illustrative and that any of the user interface items shown within the user interface 200B may be modified in response to the detection of the mouse cursor 210 hovering over the advertisement 118.

As also described briefly above, if the user 108 utilizes a mouse input device to move the mouse cursor 210 away from the advertisement 118, the preview of the advertiser-sponsored theme 120 as applied to the Web page 116 will be removed from the user interface 200B. If this occurs, the user interface 200B would revert to the user interface 200A described above with reference to FIG. 2.

If the user 108 utilizes a mouse button to select the advertisement 118, the advertiser-sponsored theme 120 will be selected for continued use with the Web application 114. As discussed above, data may be stored in the user profile 124 indicating the selection of the advertiser-sponsored theme 120. Additionally, data may be stored for use by the advertiser associated with the advertisement 118 to indicate the selection. As will be described in greater detail below with respect to FIG. 4, a notification may be provided to other users in a social network of the user 108 indicating the selection of the advertiser-sponsored theme 120.

Figure 4:
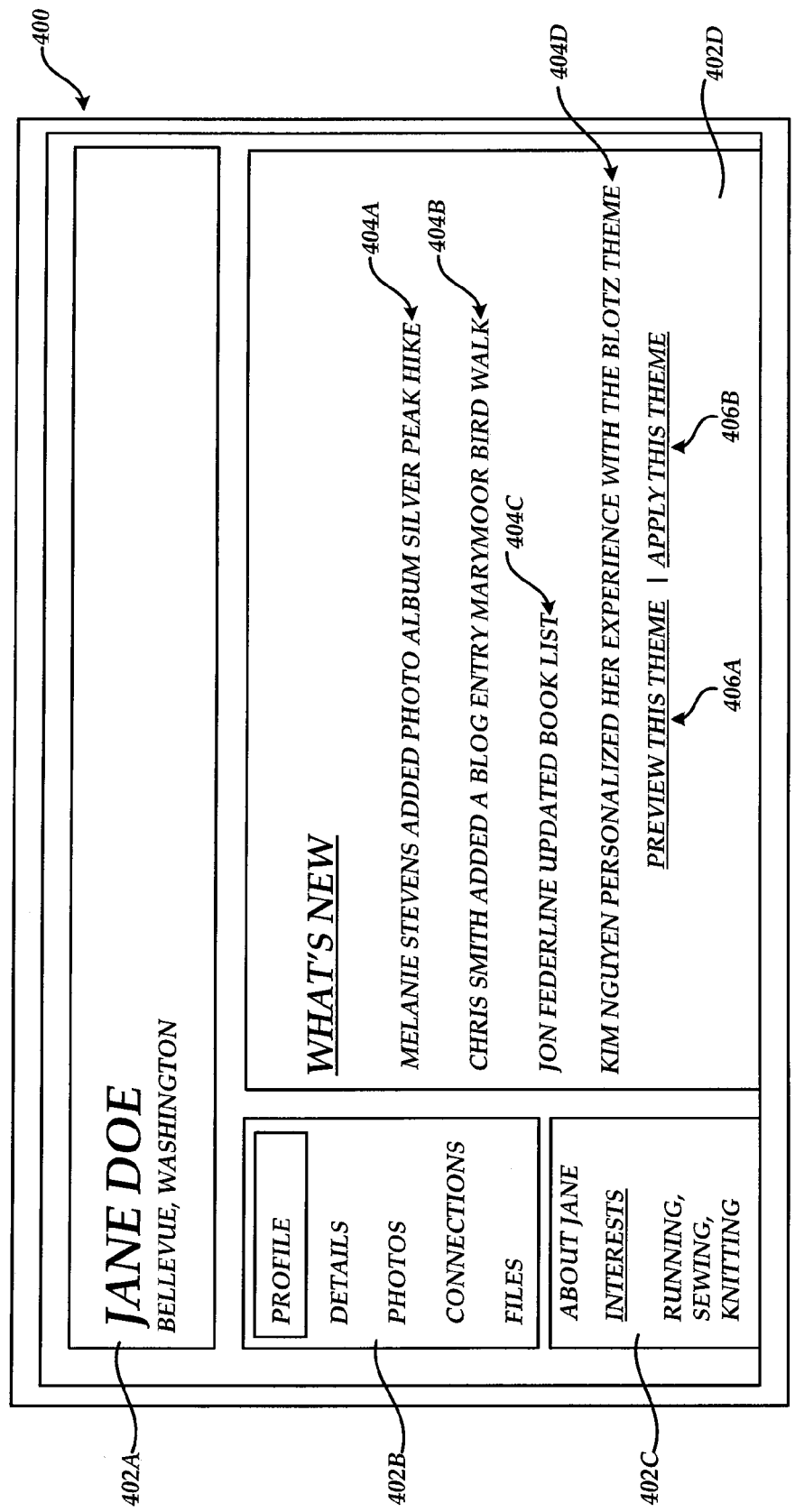
FIG. 4 is a user interface diagram showing one illustrative user interface presented herein for notifying a user that another user within their social network has selected an advertiser-sponsored theme for use with a Web application and for enabling the preview and application of the selected theme.

Referring now to FIG. 4, one user interface presented herein for notifying a user that another user within a social network has selected an advertiser-sponsored theme 120 for use with a Web application 114 and for enabling the preview and selection of the selected theme will be described. As discussed briefly above, the Web application 114 is configured in one embodiment to provide a notification to other users in a social network of the user 108 when the user 108 selects an advertiser-sponsored theme 120 for use with the Web application 114. As known in the art, a social network is a collection of users that share interests or activities. FIG. 4 shows a graphical view of a profile page 400 as it might be rendered to provide such a notification.

The profile page 400 may be accessed in a conventional manner utilizing the Web browser 110 in one embodiment. It should be appreciated that the social networking functions described herein may be implemented by the Web application 114 or by another application that is affiliated with or operating in conjunction with the Web application 114. In order to provide this functionality in conjunction with affiliated Web services, the Web application 114 may provide notifications to other affiliated systems or services indicating that a user has selected the advertiser-sponsored theme 120 for use with the Web application 114.

In one implementation, the profile page 400 includes a first user interface pane 402A that identifies the user that owns the profile page 400. For instance, in the example shown in FIG. 4, the pane 402A identifies the owner of the profile page 400 as "Jane Doe", who lives in Bellevue, Washington. In the embodiment shown in FIG. 4, the profile page 400 also includes a user interface pane 402B that a visitor may utilize to view details regarding the user associated with the profile page 400, such as detailed personal information, photographs, connections, data files, and other information. In this embodiment, the pane 402B includes selectable user interface items that may be selected on the page 400 to display the desired information. The pane 402C includes data about the owner of the profile page 400, such as their particular interests.

In the implementation shown in FIG. 4, the profile page 400 also includes a user interface pane 402D that includes a section for displaying information regarding recent activities of other users within the social network of the owner of the profile page 400. In the example shown in FIG. 4, users named "Melanie Stevens," "Chris Smith," "Jon Federline," and Kim Nguyen" are in the social network of the owner of the profile page 400. The messages 404A-404D are displayed in the user interface pane 402D regarding the recent activities of these users. For instance, the message 404A indicates that the user named Melanie Stevens has recently added a photo album, the message 402B indicates that the user named Chris Smith has recently added a blog entry, and the message 402C indicates that the user named Jon Federline has recently updated a book list.

In the example shown in FIG. 4, the message 404D indicates that the user named Kim Nguyen has recently selected the advertiser-sponsored theme 120 discussed above for use with the Web application 114. In one embodiment, a text message 406A is also provided that may be utilized to preview the application of the theme 120 to the profile page 400 and other pages provided by an associated Web application in the same manner as described above with respect to FIGS. 2-3. For instance, a mouse user interface device may be utilized to hover a mouse cursor over the text message 406A in order to preview the application of the theme 120 to the profile page 400.

A text message 406B may also be displayed and selected in order to cause the theme 120 to actually be applied to the profile page 400 in the manner described above with respect to FIGS. 2-3. It should be appreciated that selection of the text message 406B may cause the theme 120 to be applied to other pages provided by the Web application that provides the profile page 400. It should also be appreciated that graphical elements may be utilized in place of the text messages 406A-406B according to embodiments.

It should be further appreciated that the user interface shown in FIG. 4 is merely illustrative and that many other types of user interfaces may be provided to display a notification to users within a social network that the user 108 has selected a user-sponsored theme 120 for use with the Web application 114 and to provide an opportunity for these users to preview and apply the theme 120 themselves. It should also be appreciated that although the embodiments presented herein provide a notification via a profile page 400 to users in a social network of the user 108 that the theme 120 has been selected, notification may be provided to any class of users and using any messaging mechanism. For instance, the user 108 may specify any number of users that should receive an e-mail message when they select the advertiser-sponsored theme 120 for use with the Web application 114.

Figure 5:
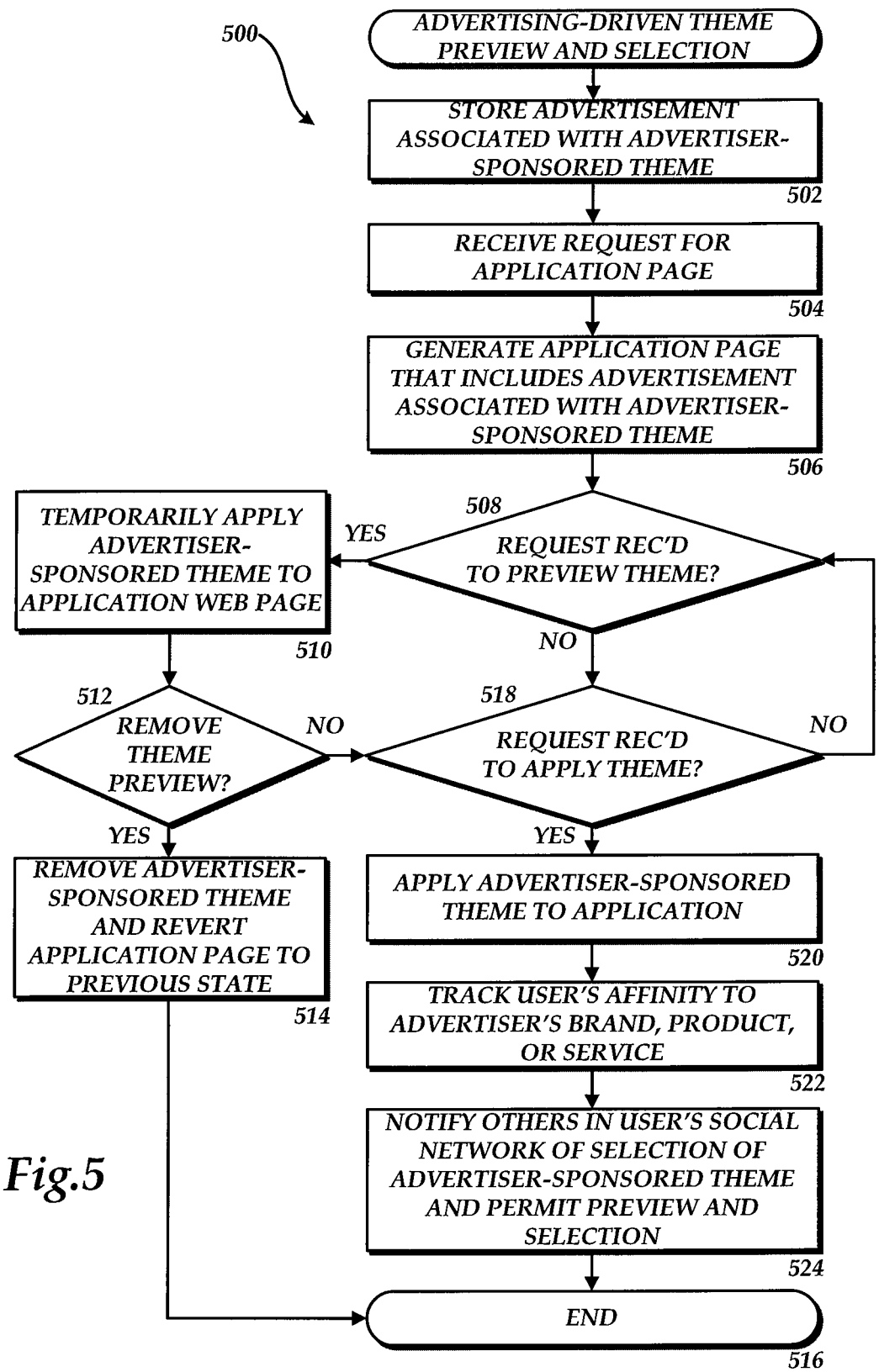
FIG. 5 is a flow diagram illustrating aspects of one routine provided herein for advertising-driven theme preview and selection.

Referring now to FIG. 5, additional details will be provided regarding the embodiments presented herein for advertising-driven theme preview and selection. In particular, FIG. 5 shows a routine 500 that illustrates aspects of the operation of the Web browser application 110 and the Web application 114 in one embodiment presented herein.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 500 begins at operation 502, where the server computer 104 stores the advertisement 118 that is associated with the advertiser-sponsored theme 120. As discussed above, the advertiser-sponsored theme 120 may be created under the direction of an advertiser and incorporate elements of the advertiser's brand into the theme. According to embodiments, the advertisement 118 may include visual elements that are replicated in the advertiser-sponsored theme 120 as described above with reference to FIG. 3.

From operation 502, the routine 500 proceeds to operation 504, where the Web application 114 receives a request from the Web browser application 110 for a Web page 116. In response thereto, the routine 500 proceeds to operation 506, where the Web application 114 generates a Web page 116 that includes the advertisement 118 associated with the advertiser-sponsored theme 120. The generated Web page 116 is returned to the Web browser application 110, where it is rendered for view and interaction by the user 108.

From operation 506, the routine 500 proceeds to operation 508, where the program code within the generated Web page 116 determines whether a request has been received from the user 108 to preview the application of the advertiser-sponsored theme 120 to the Web page 116. As discussed above, such a request may come in the form of a user input event, such as a mouse cursor 210 hovering over the display of the advertisement 118. If such a request is received, the routine 500 proceeds from operation 508 to operation 510, where the advertiser-sponsored theme 120 is temporarily applied to the display of the Web page 116.

From operation 510, the routine 500 proceeds to operation 512, where the program code within the Web page 116 determines whether a user input event was received indicating that the preview of the advertiser-sponsored theme 120 should be removed. For instance, as discussed above, such an event may comprise the removal of the mouse cursor 210 from the display of the advertisement 118. If such a request is received, the routine 500 proceeds to operation 514, where the program code removes the advertiser-sponsored theme 120 from the display of the Web page 116 and reverts the Web page 116 to its previous state. From operation 514, the routine 500 proceeds to operation 516, where it ends.

If, at operation 508, it is determined that a request to preview the theme 120 was not received, the routine 500 proceeds to operation 518. At operation 518, the program code within the Web page 116 determines whether the user 108 requested that the advertiser-sponsored theme 120 be applied to the Web application in a persistent manner. If such a request was not received, the routine 500 returns to operation 508, discussed above. If, however, such a user input event is detected, such as the selection of the advertisement 118 through a mouse button press or other appropriate user input event, the routine 500 proceeds from operation 518 to operation 520.

At operation 520, the advertiser-sponsored theme 120 is applied to the Web application 114 in a persistent manner. As discussed above, data may be stored in a user profile 124 corresponding to the user 108 that identifies the advertiser-sponsored theme 120. In this manner, each time the user returns to the Web application 114, the appropriate theme 120 may be utilized to generate the Web pages 116.

From operation 520, the routine 500 proceeds to operation 522, where the Web application 114 tracks the user's affinity to the advertiser's brand product or service. As discussed above, this may include storing data indicating that the advertiser-sponsored theme 120 was selected for use by the user 108. This data may later be used to provide targeted advertising to the user 108, or in another manner. From operation 522, the routine 500 proceeds to operation 524, where other users in a social network of the user 108 are identified of the selection of advertiser-sponsored theme 120. As also discussed above with respect to FIG. 4, these users may be presented an opportunity to preview and select the advertiser-sponsored theme 120 in the same manner as described above. From operation 524, the routine 500 proceeds to operation 516, where it ends.

Figure 6:
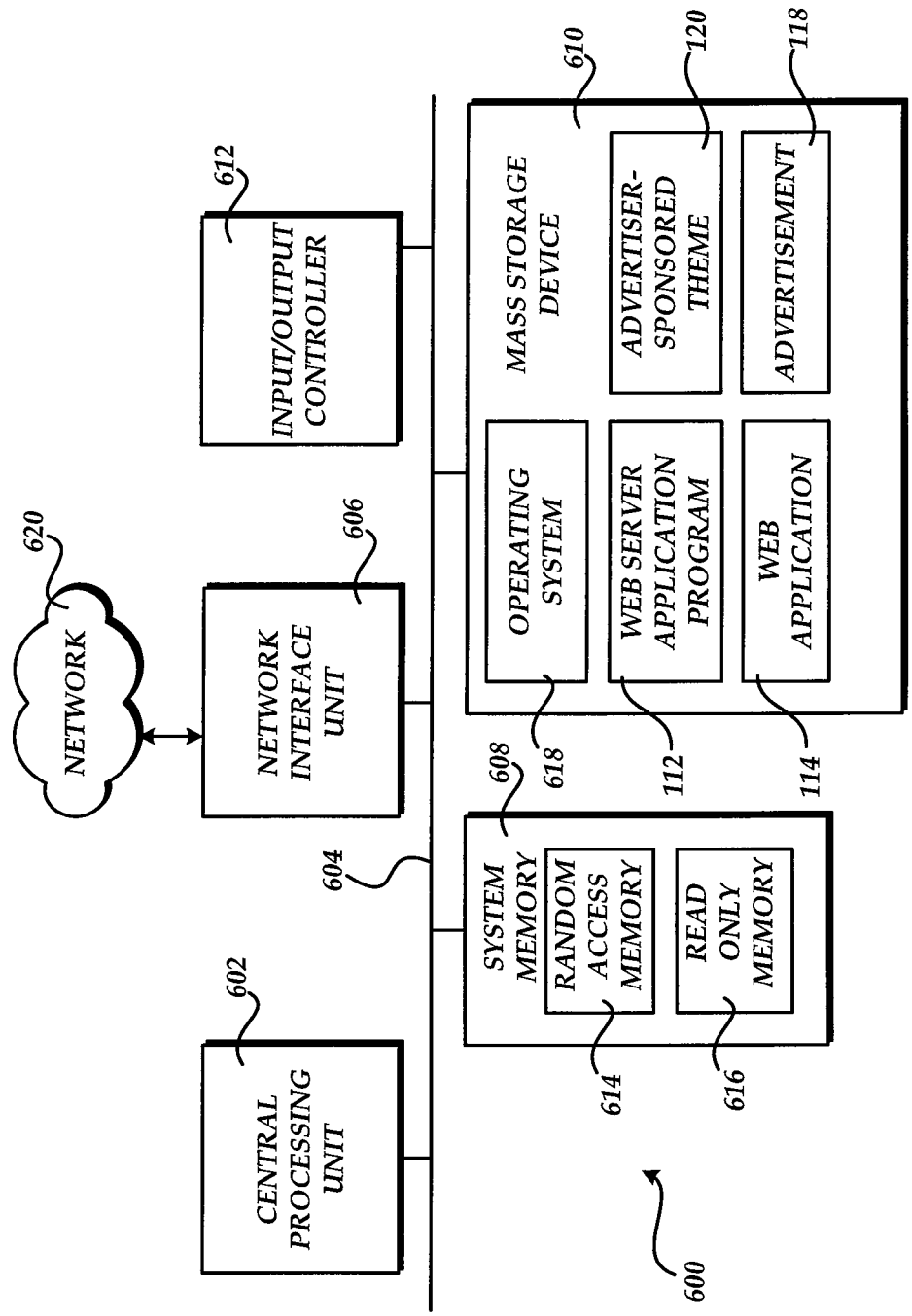
FIG. 6 is a computer architecture diagram showing an illustrative computer hardware and software architecture for a computing system capable of implementing aspects of the embodiments presented herein.

FIG. 6 shows an illustrative computer architecture for a computer 600 capable of executing the software components described herein for advertising-driven theme preview and selection in the manner presented above. The computer architecture shown in FIG. 6 illustrates a conventional desktop, laptop, or server computer and may be utilized to execute any aspects of the software components presented herein described as executing on the client computer 102 or the server computer 104.

The computer architecture shown in FIG. 6 includes a central processing unit 602 ("CPU"), a system memory 608, including a random access memory 614 ("RAM") and a read-only memory ("ROM") 616, and a system bus 604 that couples the memory to the CPU 602. A basic input/output system containing the basic routines that help to transfer information between elements within the computer 600, such as during startup, is stored in the ROM 616. The computer 600 further includes a mass storage device 610 for storing an operating system 618, application programs, and other program modules, which are described in greater detail herein.

The mass storage device 610 is connected to the CPU 602 through a mass storage controller (not shown) connected to the bus 604. The mass storage device 610 and its associated computer-readable media provide non-volatile storage for the computer 600. Although the description of computer-readable media contained herein refers to a mass storage device, such as a hard disk or CD-ROM drive, it should be appreciated by those skilled in the art that computer-readable media can be any available computer storage media that can be accessed by the computer 600.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 600.

According to various embodiments, the computer 600 may operate in a networked environment using logical connections to remote computers through a network such as the network 620. The computer 600 may connect to the network 620 through a network interface unit 606 connected to the bus 604. It should be appreciated that the network interface unit 606 may also be utilized to connect to other types of networks and remote computer systems. The computer 600 may also include an input/output controller 612 for receiving and processing input from a number of other devices, including a keyboard, mouse, or electronic stylus (not shown in FIG. 6). Similarly, an input/output controller may provide output to a display screen, a printer, or other type of output device (also not shown in FIG. 6).

As mentioned briefly above, a number of program modules and data files may be stored in the mass storage device 610 and RAM 614 of the computer 600, including an operating system 618 suitable for controlling the operation of a networked desktop, laptop, or server computer. The mass storage device 610 and RAM 614 may also store one or more program modules. In particular, the mass storage device 610 and the RAM 614 may store the Web server application program 112, the Web application 114, the advertiser-sponsored theme 120, and the advertisement 118, each of which was described in detail above with respect to FIGS. 1-5. The mass storage device 610 and the RAM 614 may also store other types of program modules and data.

Based on the foregoing, it should be appreciated that technologies for advertising-driven theme preview and selection are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for previewing and selecting an advertiser-sponsored theme, the method comprising:

displaying an application page comprising an advertisement for a brand of an advertiser, the advertisement being associated with the advertiser-sponsored theme;

detecting a user input event with respect to the advertisement;

in response to detecting the user input event with respect to the advertisement, selecting the advertising-sponsored theme for use with the application page; and in response to selecting the advertiser-sponsored theme for use with the application page, providing a notification of the selection of the advertiser-sponsored theme for use with the application page to one or more users of a social network, wherein the notification further comprises a message selectable by the one or more users in order to preview the advertiser-sponsored theme to one or more World Wide Web (Web) pages.

2. The method of claim 1, wherein the one or more users of the social network are associated with a user that generated the user input event.

3. The method of claim 1, further comprising:

storing data for use by an advertiser indicating that the advertiser-sponsored theme was selected for use with the application page.

4. The method of claim 1, wherein detecting the user input event comprises detecting a selection of a mouse button while a mouse cursor is over the advertisement.

5. The method of claim 1, wherein the advertiser-sponsored theme comprises one or more visual elements contained in the advertisement.

6. The method of claim 1, wherein selecting the advertiser-sponsored theme for use with the application page comprises storing data in a user profile that identifies the advertiser-sponsored theme, the user profile being associated with a user that selected the advertiser-sponsored theme for use with the application page.

7. One of an optical disk, a magnetic storage device or a solid state storage device having computer executable instructions stored thereon which, when executed by a computer, cause the computer to:

displaying an application page comprising an advertisement offered by an advertiser, the advertisement being associated with an advertiser-sponsored theme;

detect a user input event with respect to the advertisement;

in response to detecting the user input event with respect to the advertisement, select the advertiser-sponsored theme for use with the application page; and in response to selecting the advertiser-sponsored theme for use with the application page, provide a notification of the selection of the advertiser-sponsored theme for use with the application page to one or more users of a social network, wherein the notification further comprises a message selectable by the one or more users in order to preview the advertiser-sponsored theme to one or more World Wide Web (Web) pages.

8. The optical disk, magnetic storage device or solid state storage device of claim 7, wherein the one or more users of the social network are associated with a user that generated the user input event.

9. The optical disk, magnetic storage device or solid state storage device of claim 7, wherein detecting the user input event comprises detecting a selection of a mouse button while a mouse cursor is over the advertisement.

10. The optical disk, magnetic storage device or solid state storage device of claim 7, wherein the advertiser-sponsored theme comprises one or more visual elements contained in the advertisement.

11. The optical disk, magnetic storage device or solid state storage device of claim 7, wherein the application page is generated by a Web application program.

12. The optical disk, magnetic storage device or solid state storage device of claim 7, wherein the notification further comprises a second message selectable by the one or more users of the social network in order to select the advertiser-sponsored theme for use with the Web application program.

13. A method for previewing and selecting an advertiser-sponsored theme for use with a World Wide Web (Web) application, the method comprising:

displaying an advertisement on a Web page of the Web application, the advertisement being associated with the advertiser-sponsored theme;

detecting a mouse cursor hovering over the advertisement;

in response to detecting the mouse cursor hovering over the advertisement, displaying a preview of the Web page with the advertiser-sponsored theme applied thereto;

detecting the selection of a mouse button while the mouse cursor is over the advertisement;

in response to detecting the selection of the mouse button while the mouse cursor is over the advertisement, selecting the advertiser-sponsored theme for use with the Web application; and in response to selecting the advertiser-sponsored theme for use with the Web application, providing a notification of the selection of the advertiser-sponsored theme for use with the Web application to one or more users of a social network, wherein the notification further comprises a message selectable by the one or more users in order to preview the application of the advertiser-sponsored theme to one or more Web pages provided by the Web application.

14. The method of claim 13, wherein the advertiser-sponsored theme comprises one or more visual elements contained in the advertisement.

15. The method of claim 13, wherein the Web application comprises a Web-based electronic mail service.

16. The method of claim 13, wherein the notification further comprises a message selectable by the one or more users in order to select the advertiser-sponsored theme for use with the Web application.

* * * * *